April 6, 1954  H. J. GOTTGETREU  2,674,041
ELLIPTICAL SCALE METHOD FOR TILT ANALYSIS
Filed Jan. 19, 1949  3 Sheets-Sheet 1
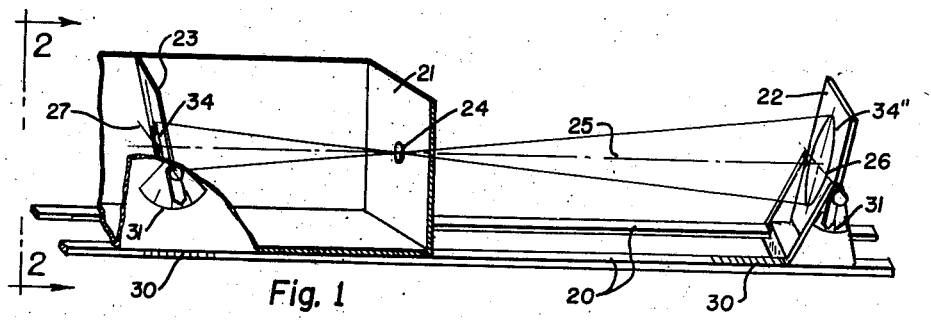
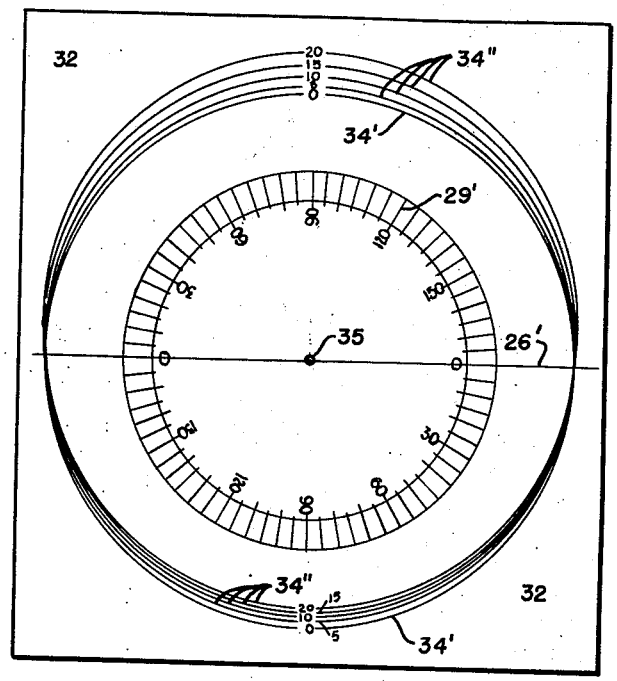
Fig. 3
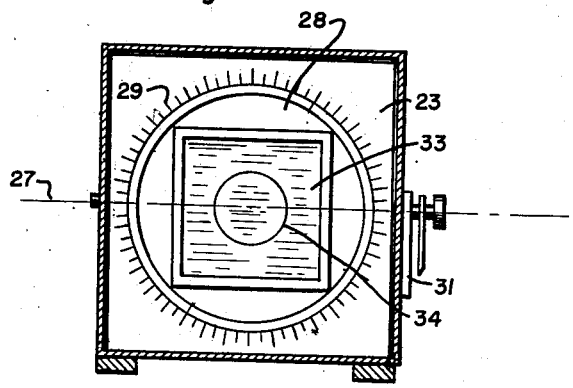
Fig. 2
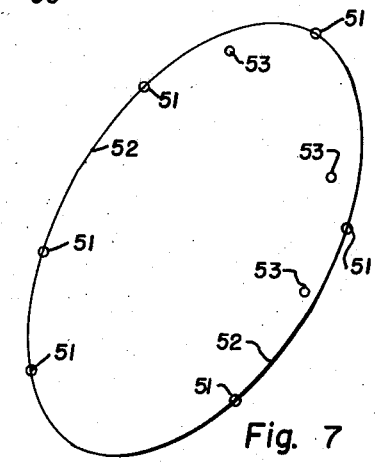
Fig. 10
Fig. 7
Inventor
HENRY J. GOTTGETREU
By  WHITEHEAD & VOGL
PER Earle Whitehead
Attorneys April 6, 1954    H. J. GOTTGETREU    2,674,041
ELLIPTICAL SCALE METHOD FOR TILT ANALYSIS
Filed Jan. 19, 1949    3 Sheets-Sheet 2

Inventor
HENRY J. GOTTGETREU
By    WHITEHEAD & VOGL
PER *Earle Whitehead*
Attorneys April 6, 1954     H. J. GOTTGETREU     2,674,041
ELLIPTICAL SCALE METHOD FOR TILT ANALYSIS
Filed Jan. 19, 1949     3 Sheets-Sheet 3
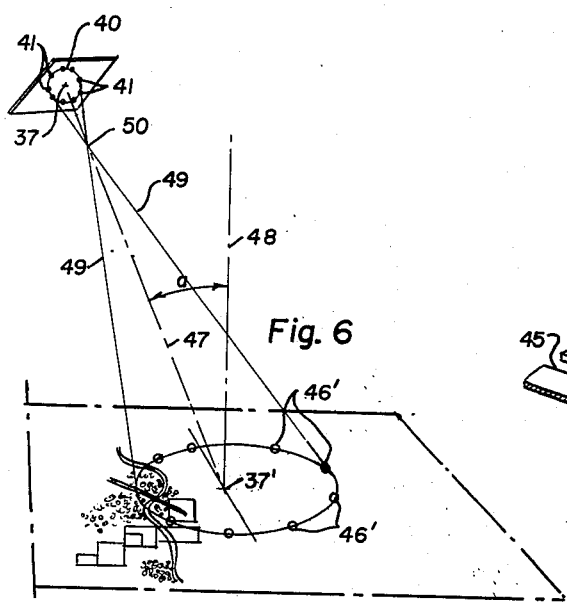
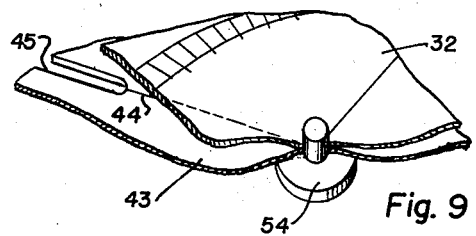
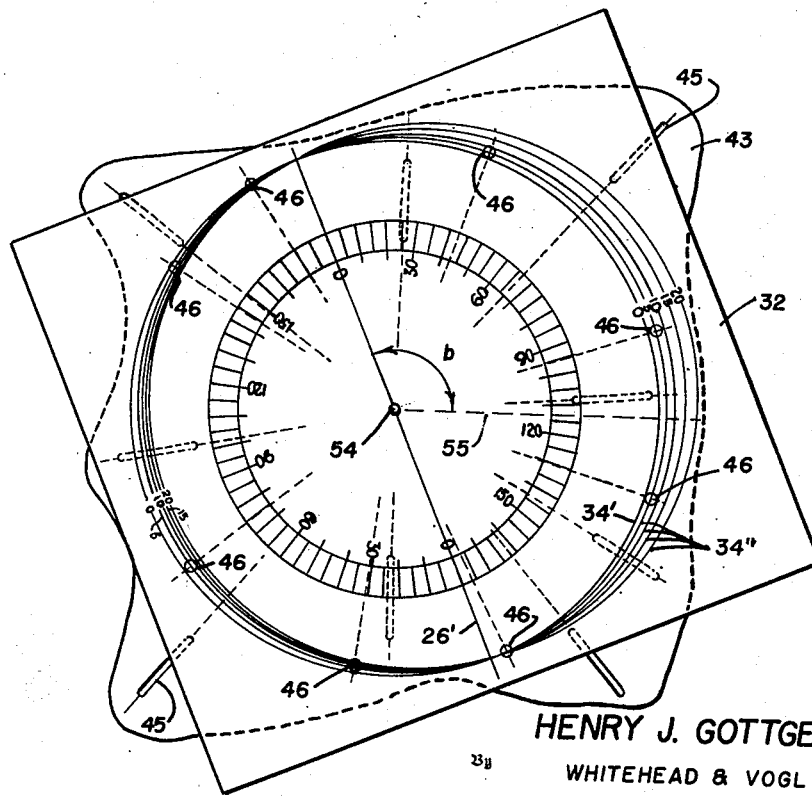
Inventor
HENRY J. GOTTGETREU
By WHITEHEAD & VOGL
PER Earle Whitehead    Attorneys Patented Apr. 6, 1954

2,674,041

UNITED STATES PATENT OFFICE 2,674,041

ELLIPTICAL SCALE METHOD FOR TILT ANALYSIS

Henry J. Gottgetreu, Colorado Springs, Colo., assignor of forty-nine one-hundredths to Leonard v. B. Sutton, Colorado Springs, Colo.

Application January 19, 1949, Serial No. 71,736

2 Claims. (Cl. 33—1)

This invention relates to a method for ascertaining the enlargement ratio, the tilt axis and degree of tilt distortion in aerial photographs, whereby rectification of such photographs may be made in connection with the construction of photographic maps, mosaics or other purposes.

In the present practice the outstanding method of making a map consisting of a mosaic of aerial photographs involves the use of slotted templates to establish a control plot to locate various ground points at the map scale and position properly the rectified photographs. Rectification of the photographs is necessary, because the aerial photographs in a group are taken at varying elevations relative to each other, the photograph scale is usually different from the map scale and frequently there is distortion due to tilt of the camera at the time the photograph was taken.

To make the slotted templates for the control plot, the aerial photographs are generally taken with sufficient overlap to permit location of a given point on three adjacent photographs in the same flight group.

Selected control points are established in each photograph, including the center, the centers of adjacent photographs, triangulation points of a ground survey and other easily discernible positions. These points are transferred to a template of sufficient size to be placed on a control board whereupon the triangulation points of the ground survey are precisely located to the desired map scale. A hole is cut out at the center point of the template, and slots are cut along radial lines from this center point through the other points in the region of the map scale positions of the points. Suitable center studs are provided to fit in the holes and slots of the various templates, and such studs are fixed at the triangulation points of the control board, while studs for other points are slidable with respect thereto. Through manipulation the studs are inserted in proper corresponding slots and holes of a plurality of overlapping templates with three or four slots engaging each stud. In this manner all templates and studs become rigidly fixed with respect to the central board in their correct map scale positions to form the control plot.

With proper location of the various points indicated by the studs, the next step is to obtain rectified photographs for the mosaic. The enlargement ratio to change the scale of the photograph may be found by comparatively simple methods; however, the correction of tilt distortion is difficult to ascertain. To perform a tilt analysis a plurality of points must be selected and the relation of distances of these points from the center of the photograph, as measured on the photograph and as measured on the control plot, must be considered, and the problem involves the location of the tilt axis as well as ascertainment of the degree of tilt. Present methods of tilt analysis are by the use of complex formulae, cumbersome tables, or mechanical rectifying devices. It is the purpose of this invention to provide a method, graphical in nature, which permits a novel, quick, accurate and simplified tilt analysis.

Another object of this invention is to provide an improved method, easily adaptable to any of the different types of rectifying cameras now in use, for ascertaining the enlargement ratio, the tilt axis and degree of tilt required to rectify aerial photographs.

Another object of this invention is to provide an improved method of ascertaining the enlargement ratio, the tilt axis, and degree of tilt required to rectify aerial photographs which is simple in nature, and which is also sufficiently accurate for the making of photographic mosaics.

Still another object of this invention is to provide an improved method for ascertaining the enlargement ratio, the tilt axis and degree of tilt required to rectify aerial photographs which may be easily understood and applied by unskilled operators with a minimum of instruction.

With the foregoing and other objects in view, all of which shall more fully hereinafter appear, the invention comprises certain novel constructions, arrangements and combinations of parts and certain novel methods and steps therein, as shall now be described and as defined in the appended claims and illustrated in the accompanying drawings, in which Figure 1 is a diagrammatic view of a rectifying enlarger with portions of the box cut away to show certain elements therein.

Figure 2 is a view partly in section and partly in elevation of the film holder of the rectifying enlarger as viewed from the line 2—2 in Fig. 1 when the film holder is in upright position.

Figure 3 is a plan view of a tilt gauge used in connection with the present invention.

Figure 6 shows and illustrates, diagrammatically, a view of the terrain photographed and the position of the photographic plate of Fig. 4, as tilted with respect to the terrain.

Figure 7 illustrates an ellipse, as defined by a number of fixed points.

Figure 8 is a plan view of the tilt gauge of Fig. 3 superposed upon the slotted template of Fig. 5.

Figure 9 is a fragmentary view in perspective of the tilt gauge and slotted template as positioned in Fig. 8, illustrating a means of centering.

Figure 10 is a plan view, on a reduced scale, of a master ratio gauge used in connection with an embodiment of the invention.

Figure 4:
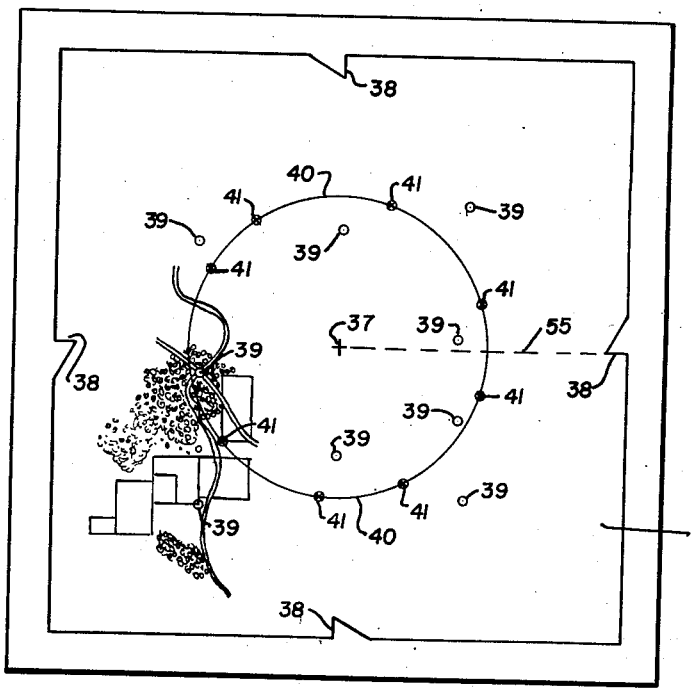
Figure 4 illustrates an aerial photograph marked for the preparation of a slotted template control in accordance with the present invention.

In essence, the method of tilt analysis herein described is to superpose a calibrated tilt gauge upon a slotted template or other figure having a plurality of points thereon correctly located to the desired map scale; where, by correlation of markings of the tilt gauge with such points, the enlargement ratio, the location of the tilt axis and the degree of tilt distortion may be determined by inspection to facilitate adjustment of a rectifying camera to produce a rectified photograph for subsequent preparation of a map. It follows that the scales of the calibrated tilt gauge should correspond with adjusting scales of the rectifying camera, and it is further desirable that the tilt gauge be developed in the rectifying camera in conjunction with which it is to be used. A plurality of tilt gauges may be used to accommodate various enlargement ratios encountered in the rectification of a group of aerial photographs, all as will be later explained.

The differences of scale between the photographs, also the tilt distortion in each photograph, necessitates a rectifying enlarger that is trebly adjustable, and the principal elements and basic operation of a conventional rectifier of this type are herewith described to aid in understanding the invention. In slidable relation along base tracks 20 there is mounted a camera box 21 and easel 22. The enlarger box 21 contains film holder 23 and lens 24, all so aligned that the camera center axis 25 lies parallel with the slidable surfaces of the base tracks 20. Further, there are means, not shown, whereby the film holder is movable along the axis 25 with respect to the lens 24 to permit the focusing of images on the easel 22 at the desired enlargement ratio. The easel 22 and film holder 23 are rotatably adjustable about parallel axes 26 and 27, respectively, which are perpendicular to and pass through the center axis 25, the rotation of the easel 22 and film holder 23 about the axes 26 and 27 being in correlation to compensate for tilt distortion and to maintain clear focus of an image on the easel. The film holder 23 is provided with a rotatable negative frame 28, as shown in Fig. 2, to align the tilt axis on a photograph with the axis 27, the degree of rotation of the negative frame 28 being indicated as by protractor 29. In this rectifier it is also necessary to provide scales 30 and protractors 31 to properly adjust the enlargement ratio, and the degree of tilt of the easel 22 and film holder 23.

In preparation for the tilt analysis of a group of aerial photographs, a tilt gauge 32 is made with the rectifier shown in Fig. 1. The rectifier is set at a desired enlargement ratio, such as that which would be established by the relation of the average scale of the group of aerial photographs to the map scale. A darkened negative film 33 is then placed in frame 28, the film 33 having a transparent circle 34 centered on the intersection of the camera axis 25 and the tilt axis 27, and of such diameter as to circumscribe the usable portion of an aerial photograph at its initial scale. Through lighting arrangement, not shown, the circle 34 is projected onto the easel 22, and with the film holder 23 and easel 22 both normal to the camera axis 25, the position of zero tilt, the projected image on the easel is a circle 34' of diameter related to the diameter of the circle 34 by the enlargement ratio. This circle 34' is then photographed on a sensitized film forming the tilt gauge 32. The easel 22 and the film holder 23 are then tilted at various angles, such as 5, 10, 15 and 20 degrees, and the projected image of the circle 34 on the easel 22 forms ellipses 34'' having common points of intersection with circle 34' at the tilt axis 26, and having a common major axis perpendicular with the tilt axis 26, but with varying eccentricities depending upon the degree of tilt of the easel and film holder. These ellipses are also photographed upon the sensitized film forming the tilt gauge 32, which is then developed in conventional manner to become a transparent sheet as shown in Fig. 3 containing the circle 34' and ellipses 34''. To complete the gauge, a protractor scale 29' is marked thereon in inverse order to the protractor scale 29 on the film holder 23, and a center hole 35 is cut therein, all for purposes which will be later described.

It is possible to use a mean enlargement ratio of a group of photographs in making this tilt gauge because the photographs of an aerial survey are usually taken at constant elevation above the terrain insofar as possible, permitting adjustments of the enlargement ratio to be within a narrow range in subsequent rectification operations. Therefore, the differential increments of the various factors concerned with enlargement may be assumed to be of linear interrelationship, whereby a master tilt gauge 32 may be used for all photographs without causing appreciable error. However, where the use of the gauge is predicated upon an approximation of the enlargement ratio which may not be precise, as will be later explained, it is expedient to prepare companion gauges identical with the master gauge 32 except as to slight variations in size. In cases where there is a wide range of enlargement ratios of the photographs, it will be expedient to prepare a group of tilt gauges similar to gauge 32 by using many enlargement ratios, all as will be later explained.

In one method of tilt analysis in accordance with the invention, where the enlargement ratios of the group of aerial photographs is within a narrow range, an aerial photograph 36, as shown in Fig. 4, is prepared for a slotted template in conventional manner. Such preparation includes: preliminary approximation of the enlargement ratio; location of a photocenter 37 by use of culminating marks 38 on the margin of the photograph; and the selection of a number of discernible points 39 such as triangulation points, centers of adjacent photographs, and advantageously-located easily-discernible ground objects. The next step, in accordance with the invention, is to scribe a circle 40, centered at 37, of predetermined diameter which is related to the diameter of the circle 34 on the negative film 33, the enlargement ratio at which the master tilt gauge 32 was prepared, and the enlargement ratio of the photograph 36 in the following manner:

$$D_{40} = D_{34} \frac{R_{32}}{R_{36}}$$

where, $D_{40}$ is the diameter of the circle 40, $D_{34}$ is the diameter of the circle 34 on the film 33, $R_{32}$ is the enlargement ratio at which the tilt gauge 32 was prepared, and $R_{36}$ is the enlargement ratio of the photograph 36. On this circle a plurality of discernible points 41, preferably eight, are located, spaced to adequately define a curve as later modified on the slotted template.

The slotted template 43 is prepared by transferring directly the points 37, 39 and 41 of the photograph 36 as points 37', 39', and 41' on the template. The template may be prepared in several ways, but it is here shown as consisting of a sheet of plastic or other material susceptible of being easily marked and cut. From the center point 37' radial rays 44 are drawn through the points 39' and 41' because upon such rays will lie the true map scale position of these points with respect to the center. A circular orifice is cut at the center 37' and slots 45 are cut along the rays 44 of the selected points 39, wherewith the template is interlaced with adjacent templates by center studs, not shown, and fixed upon a control board at the desired scale, the center studs giving the true map scale location of the points 39', all in conventional and well known procedure. Likewise, through the use of the slotted template control, by locating the points 41' on adjacent templates, the true location of the points 41' may be found at the map scale as indicated by the points 46, this step being taken in conventional manner. It is to be pointed out that the use of a slotted template control for locating the true map scale position of the points 46 is illustrative, and other conventional methods for locating the points 46 may be used without departing from the scope of the invention.

Figure 5:
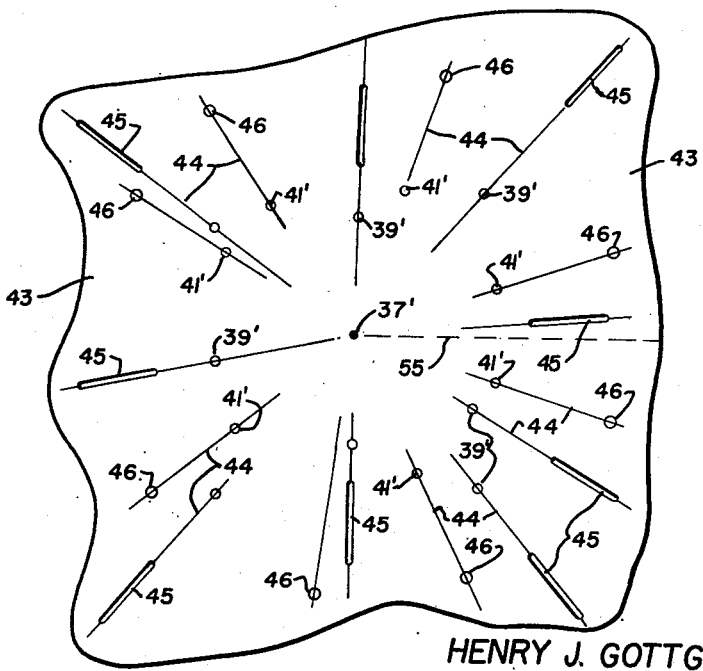
Figure 5 is a plan view of a slotted template developed from the aerial photograph illustrated at Fig. 4.

While the points 41', in Fig. 5, located directly from the circle 40, necessarily lie on a circle, the correctly positioned points 46 do not necessarily lie on a circle but may more commonly lie on an ellipse. This may be illustrated by the diagram at Fig. 6 which shows a portion of the terrain on photograph 36 with the position of the photograph 36 as in the aerial camera at exposure, the axis 47 of the aerial camera being normal to the photograph 36, but tilted from a normal 48 from the surface of the earth as by an angle. By construction the ground points 46' on the surface of the earth appear as points 41 on the photograph 36 to form the circle 40, and it follows that rays of light 49, to the points 41 lie on the surfaces of conjugate right circular cones about axis 47, and with focal point at 50. Since the axis 47 is not normal to the surface of the earth, the intersection of the terrain with the right circular cone does not form a circle, but more nearly an ellipse depending upon the angle and also depending on the flatness of the terrain. Since axis 37 is the focal center of the photograph, all points appearing on the photograph which are distorted from their actual terrain position, are distorted along radii from said focal center or axis 37 of the camera and, as focal center 37 of the photograph coincides with focal center 37' of the template, points 41' and 46 are on common radii from the focal center 37'. In the preparation of maps from aerial photographs it is usually satisfactory to assume that the terrain lies in a plane, since compensations for irregular landmarks may be made, as will be explained, and the curve defined by the points 46 which are at the true map scale position of the ground points 46' on the slotted template 43 may be considered as an ellipse for all practical purposes.

Therefore, it follows that the points 41 on the photograph 36 can be suitably defined and rectified to the position of the map scale points 46 by properly adjusting the rectifying enlarger. The necessary adjustments of the enlarger will be indicated by the tilt gauge 32 by fitting an ellipse 34'' with the points 46 on the slotted template 43. As shown in Fig. 7 a group of points 51 may define an ellipse 52. From an analytical viewpoint the number of known points should be five, but in the practice of this invention it has been found that a preferable number of points is eight, more or less, to permit the operator to compensate for positions of irregular elevation, such as indicated by points 53 which do not fall upon the ellipse 51. By selecting a sufficiently large number of points 41 on the photograph 36 a skilled operator can thus make accurate tilt analysis of very rugged and irregular terrain.

The transparent tilt gauge 32 is superposed upon the slotted template 43 by aligning the gauge center 35 with the template center 37' as with center stud 54 shown in Fig. 9 whereby rotation of the gauge 32 about the template 43 is facilitated. The gauge 32 is thus rotated about the template 43 until a majority of the points 46 fall on a common tilt ellipse 34'' such as the 5 degree ellipse as illustrated, or proportionately between consecutive tilt ellipses whereby the degree of tilt may be determined through interpolation. With this alignment and correlation attained, the gauge is then read for adjustments of the rectifying camera. The easel 22 and film holder 23 are tilted to the degree indicated by the ellipse 34''. The negative frame 28 is rotated to an angle B between the axis 26' of the tilt gauge and a photograph reference mark 55, for the position of the axis 26' over the slotted template locates the tilt axis of the photograph.

The ascertainment of the enlargement ratio is the next step. As might be anticipated, the case often arises where the points 46 will not fit any of the ellipses of the tilt gauge, all points appearing to fall inside or outside the gauge. This occurs because of error in approximation of the magnification ratio in the preliminary step of the process whereby the diameter of the circle 40 was obtained. If the gauge fits the points 46, the approximated enlargement ratio is correct, but otherwise it is necessary to use companion gauges identical to the master gauge 32, but of slightly different magnification ratios, one per cent differences being desirable steps. By trial, when a companion gauge is found which intersects the points 46, for instance a gauge having a magnification ratio 2 per cent less than the master gauge, it is possible to immediately ascertain the correct magnification ratio as being two per cent less than the value originally used.

In another method of tilt analysis in accordance with the invention, where the enlargement ratios of the group of aerial photographs is over a wide range, it becomes more expedient to use a group of tilt gauges, as 32, and dispense with a master gauge. Such tilt gauges are prepared for the range of enlargement ratios, preferably in uniform increments as 1 per cent differences, with all scales based upon a given diameter of the circle 34. In mapping a large project, it may be desirable to prepare a large number of tilt gauges, and it thus becomes expedient to provide a master ratio gauge 56 to assist in the selection of the proper tilt gauge, as will be presently explained. This master ratio gauge may be made in the same manner as the tilt gauges 32, but by holding the easel 22 and film holder 23 at zero degree tilt and varying the enlargement ratio to form a group of concentric circles 57 about center 58, or more conveniently by drawing a group of concentric circles of predetermined diameters.

The photograph 36 is prepared as previously described except that the circle 40 is drawn the same size as the circle 34 of the darkened negative 33, whereupon the relocated points 46 on the slotted template 43 are obtained in the same manner as previously described. The master ratio gauge 56 is then placed over the slotted template 43 with the center 58 aligned with the template center 37' in a manner similar to that shown in Fig. 9. The circles 57 of the master ratio gauge will not fit the ellipse formed by the points 46, nevertheless there is an indication of the proper enlargement ratio, which will be easily ascertainable by an operator after a little practice. Once the enlargement ratio is thus obtained, the proper tilt scale 32 is selected and superposed upon the template 43 for the subsequent analysis of tilt axis location and degree.

In rectifying enlargers which have the scales 30 and 31 calibrated with respect to the actual elevation and tilt angle of the camera at the time the photograph was taken, it may be advantageous to prepare calibrated tilt gauges as 32 without using the rectifying enlarger in the manner hereinabove described, but by directly preparing the tilt ellipses by analytical methods. To do this it is necessary to know the focal length of the camera, and the desired map scale. With such information, one skilled in the art can readily ascertain the elliptical curve which would represent to map scale the true curve of a circle of given diameter on the photograph. One method of ascertaining these elliptical curves is to select the desired diameter of the photo circle 40, then ascertain the equation of the right circular cone formed by light rays 49 from the focal point 50 to the circle 40. This gives the equation of the conjugate right circular cone formed by the rays 49 extending from the focal point 50 away from the circle 40. By passing a plane through this right circular cone at a distance from the focal point 50 determined by the enlargement ratio and with a tilt with respect to the axis of cone 47, the equation of the resulting line of intersection, an ellipse, can be ascertained by methods of analytical geometry. Such an elliptical curve on a tilt gauge 32 would be calibrated to indicate the distance from the camera to the principal point on the ground and actual tilt of the camera at the time the photograph was taken.

I have illustrated and described many details in constructions and steps but my protection is not to be limited to such details as modifications, alternatives and equivalents will occur to those skilled in the art, within the expected skill of their calling, all within the scope and spirit of the foregoing description and of the appended claims.

I claim:

1. The method of ascertaining the location of tilt axis and degree of tilt distortion of an aerial photograph for rectification for its inclusion in a mosaic map, including conventional means for ascertaining the true map-scale position of any given point on the photograph from the photograph center, and the steps of marking a circle on the photograph centered at said photograph center point, marking on the circle a plurality of points ascertainable on the photograph as known points, marking said points in their true map-scale position by use of said conventional means and superposing, over said true map-scale points, a gauge calibrated to show the eccentricity of said points from their apparent circular relation to the center point on the photograph.

2. The method of ascertaining the location of tilt axis and degree of tilt distortion of an aerial photograph for rectification for its inclusion in a mosaic map wherein a conventional slotted template control plot is used as means for ascertaining the true map-scale position of any selected point in the photograph with an individual slotted template prepared for the photograph and the steps of marking a circle on the photograph centered at the photograph center, marking on the circle a plurality of points ascertainable on the photograph as known points, marking said known points on the slotted template, transferring and marking said points on the slotted template to their true map-scale position through conventional operations of the template control plots and superposing, over said true map-scale points, a gauge calibrated to show the eccentricity of said points from their apparent circular relation to the center point on the photograph.

References Cited in the file of this patent

UNITED STATES PATENTS

| Number | Name | Date |
| --- | --- | --- |
| 1,403,677 | Faas | Jan. 17, 1922 |
| 1,485,493 | Edmunds | Mar. 4, 1924 |
| 1,528,021 | Janzer | Mar. 3, 1925 |
| 1,541,555 | Fairchild et al. | June 9, 1925 |
| 1,577,224 | Gorden | Mar. 16, 1926 |
| 1,713,498 | Cooke | May 14, 1929 |
| 1,858,353 | Aldis | May 17, 1932 |
| 2,293,416 | Terpening | Aug. 18, 1942 |
| 2,487,814 | Landen | Nov. 15, 1949 |

FOREIGN PATENTS

| Number | Country | Date |
| --- | --- | --- |
| 319,867 | Great Britain | Oct. 3, 1929 |